(12) United States Patent
Hanada

(10) Patent No.: US 11,839,185 B2
(45) Date of Patent: Dec. 12, 2023

(54) CUTTING WORK MACHINE

(71) Applicant: Yamabiko Corporation, Tokyo (JP)

(72) Inventor: Kazuya Hanada, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 237 days.

(21) Appl. No.: 17/551,836

(22) Filed: Dec. 15, 2021

(65) Prior Publication Data

US 2022/0183234 A1    Jun. 16, 2022

(30) Foreign Application Priority Data

Dec. 16, 2020    (JP) .................................. 2020-208726

(51) Int. Cl.
*A01G 3/04* (2006.01)

(52) U.S. Cl.
CPC ........ *A01G 3/04* (2013.01); *A01G 2003/0461* (2013.01)

(58) Field of Classification Search
CPC .................................. A01G 3/053; A01G 3/04
See application file for complete search history.

(56) References Cited

U.S. PATENT DOCUMENTS

| | | | | |
|---|---|---|---|---|
| 68,109 A * | 8/1867 | Porter | ..................... | A01G 3/053 7/161 |
| 1,693,707 A * | 12/1928 | Dishmaker | ............ | A01G 3/053 30/218 |
| 2,564,032 A * | 8/1951 | Roberton | ............... | A01G 3/053 30/216 |
| 2,664,626 A * | 1/1954 | Jepson | .................... | A01G 3/053 D8/8 |
| 3,309,769 A * | 3/1967 | Maxson | ................. | A01G 3/053 D8/8 |
| 3,364,574 A * | 1/1968 | Stelljes | .................. | A01G 3/053 30/144 |
| 3,552,013 A * | 1/1971 | Stone | ..................... | A01G 3/053 30/132 |
| 3,564,714 A * | 2/1971 | Wells | ..................... | A01G 3/053 30/223 |
| 3,795,050 A * | 3/1974 | Latsha | ................... | A01G 3/053 30/132 |
| 4,280,276 A * | 7/1981 | Comer | ................... | A01G 3/053 30/372 |
| 4,592,142 A * | 6/1986 | Schnizler | ............... | A01G 3/053 30/233 |

(Continued)

FOREIGN PATENT DOCUMENTS

JP    2015116131 A    6/2015

*Primary Examiner* — Sean M Michalski
(74) *Attorney, Agent, or Firm* — GRUMBLES LAW PLLC; Brittany Haanan

(57) ABSTRACT

The present invention provides a cutting work machine, wherein a cutter unit includes upper and lower blades, which are connected to an upper cutter support, and a guard member that is provided on the upper cutter support. Both blades reciprocate in opposite front-back directions. The guard member includes a guard plate that projects to the right from the upper cutter support and a fixed blade that projects to the left from the upper cutter support. Front edge portions of the guard plate and the fixed blade are positioned forward of foremost cutting edges of both blades. The fixed blade faces forward against the foremost cutting edge of the upper blade.

9 Claims, 9 Drawing Sheets

(56) References Cited

U.S. PATENT DOCUMENTS

| | | | |
|---|---|---|---|
| 5,031,395 A * | 7/1991 | Ohkanda | A01G 3/053 56/301 |
| 5,048,277 A * | 9/1991 | Trimarco | A01G 3/053 56/DIG. 4 |
| 5,653,029 A * | 8/1997 | Shigenaka | A01G 3/053 30/233 |
| 9,736,991 B2 * | 8/2017 | Hanada | A01G 3/053 |
| 11,723,314 B2 * | 8/2023 | Ito | A01D 34/90 30/211 |
| 2012/0017558 A1 * | 1/2012 | Pellenc | A01G 3/04 56/233 |
| 2016/0360708 A1 * | 12/2016 | Hanada | A01G 3/053 |
| 2019/0338839 A1 * | 11/2019 | Hanada | A01G 3/053 |
| 2023/0133010 A1 * | 5/2023 | Kutsuna | A01G 3/053 30/208 |

* cited by examiner

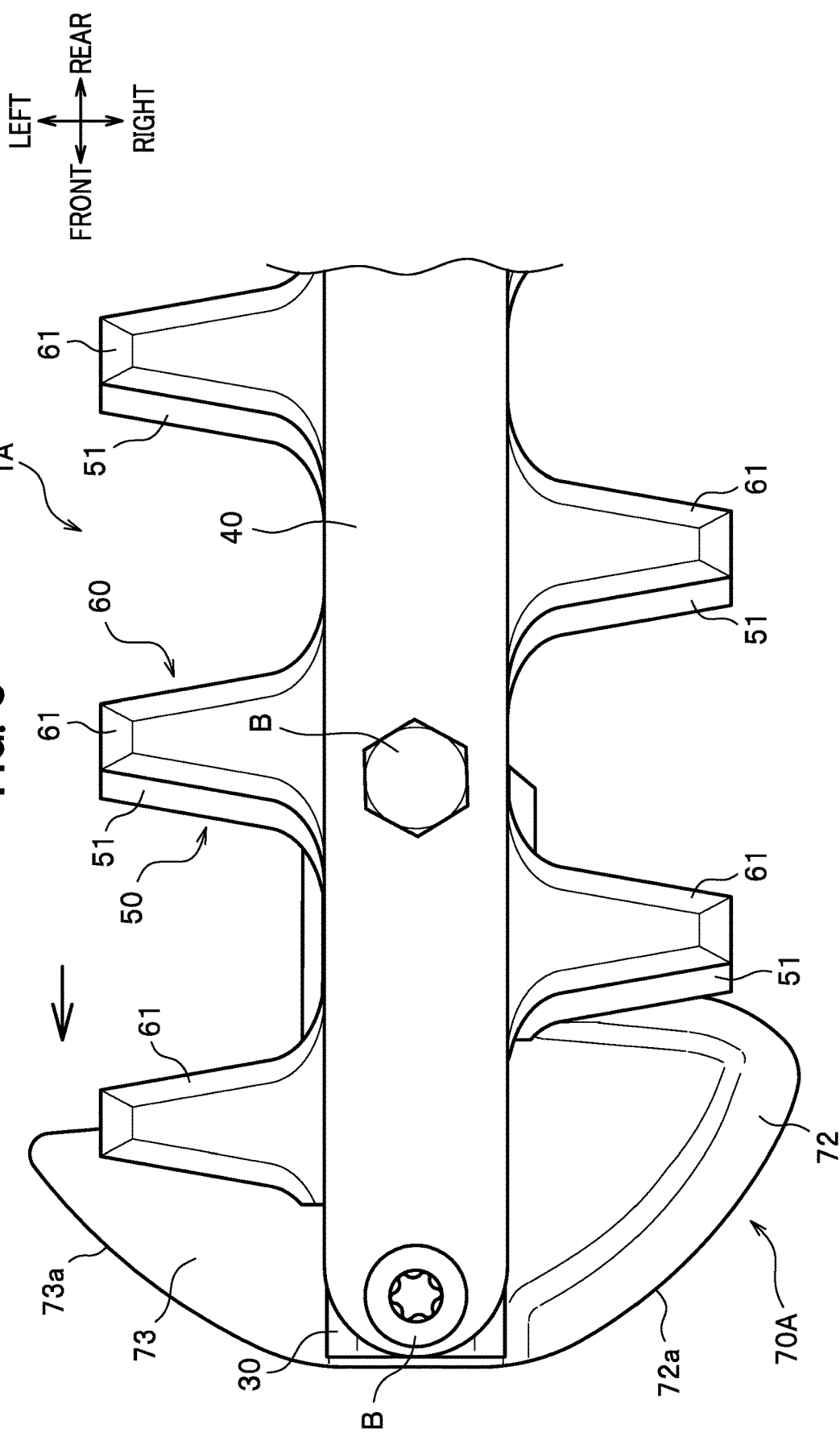

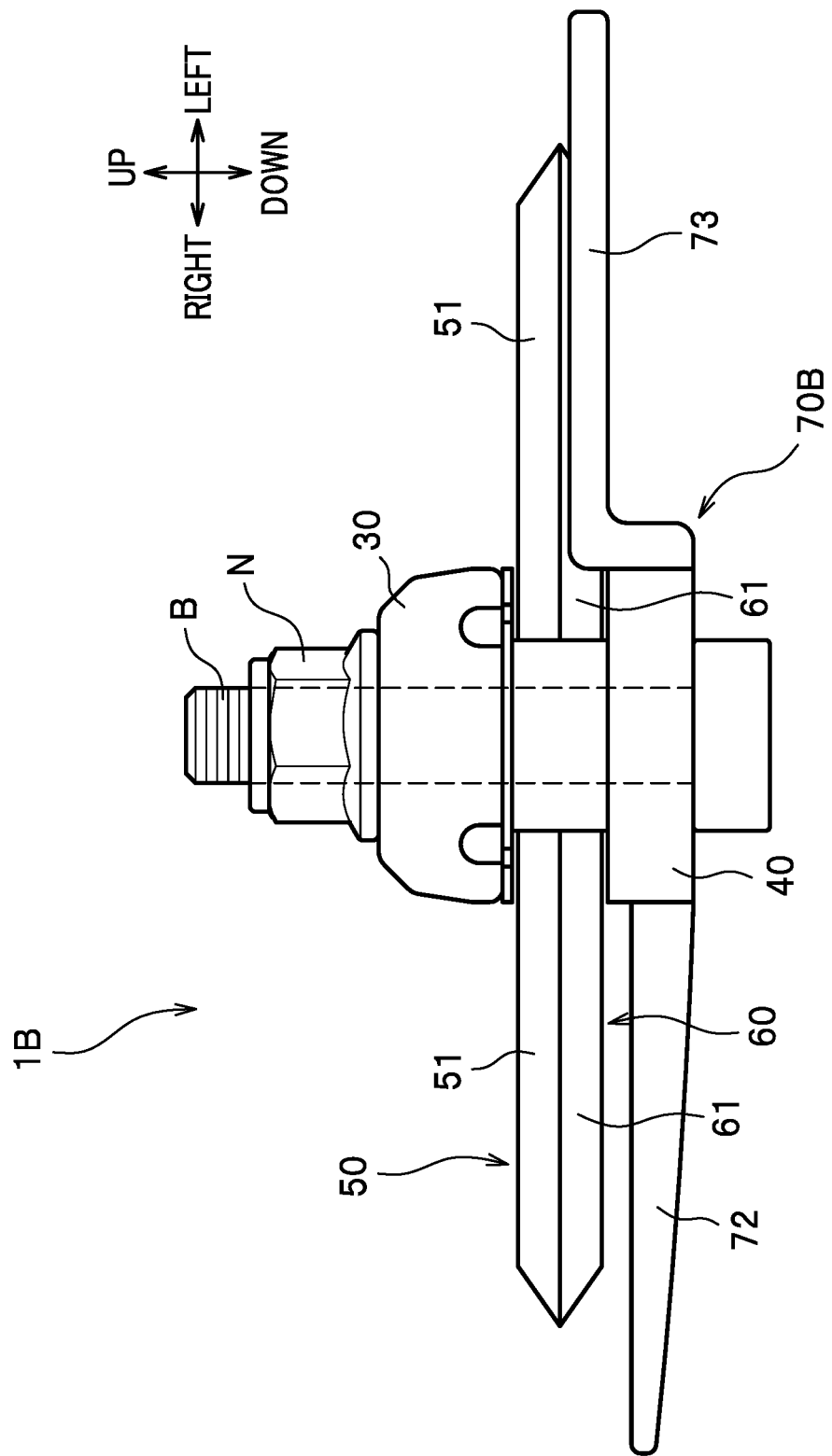

CUTTING WORK MACHINE

CROSS-REFERENCE TO RELATED APPLICATION

This application is based upon and claims priority from the Japanese Patent Application No. 2020-208726, filed on Dec. 16, 2020, the entire contents of which are incorporated herein by reference.

BACKGROUND OF THE INVENTION

1. Field of the Invention

The present invention relates to a cutting work machine.

DESCRIPTION OF THE RELATED ART

As a cutting work machine used for trimming and pruning hedges and plants, there is a hedge trimmer (trimming machine) that includes a cutter support extending forward from the main unit and upper and lower blades connected to the cutter support, wherein both blades reciprocate in opposite front-back directions.

Among the cutting work machines, there is one that includes a cylinder extending forward from the main unit, a cutter support connected to the front end portion of the cylinder, and a blade connected to the cutter support, wherein the blade is configured to reciprocate by a drive transmission shaft inserted through the cylinder.

Among the above-mentioned cutting work machines, there is one that is configured to prevent the front end portion of the blade from hitting a structure such as a wall or a building during trimming work by fixing a guard member to the cutter support and positioning the front end portion of the guard member forward of the front end portion of the blade (see, for example, Japanese Patent Application Publication No. 2015-116131 (Patent Document 1)).

SUMMARY OF THE INVENTION

In the conventional cutting work machine described above, it is difficult to trim branches located near a structure because branches cannot be cut between the guard member and the foremost cutter edge of the blade. Therefore, the operator needs to manually trim the branches in the vicinity of the structure, which makes the work of trimming and pruning hedges and plants more complicated.

In the conventional cutting work machine described above, a saw extended in the front-back direction is placed between the guard member and the foremost cutter edge of the blade, and the saw is fixed to the cutter support, but this configuration has the problem of narrowing the area that can be cut by the blade.

The present invention solves the aforementioned problems and aims to provide a cutting work machine that can easily cut branches near a structure and can secure a large area to be cut by the blade, even when a guard member is provided at the front end portion of the cutter support.

To solve the above-described problem, a first aspect according to the present invention is a cutting work machine including a main unit, and a cutter unit that is driven by driving power of the main unit. The cutter unit includes a cutter support that extends forward from the main unit, upper and lower blades that are connected to the cutter support in a freely movable manner in a front-back direction, and a guard member that is provided at a front end portion of the cutter support. Both of the blades includes cutting edges projecting in a right-left direction. Both blades, stacked on top of each other above and below, are configured to reciprocate in opposite front-back directions. The guard member includes a guard plate that projects in one of right and left directions from the cutter support, and a fixed blade that projects in the other of the right and left directions from the cutter support. Front edge portions of the guard plate and the fixed blade are positioned forward of foremost cutting edges of both blades. The guard plate is positioned above the cutting edge of the upper blade. The fixed blade faces forward against the foremost cutting edge of the upper blade.

To solve the above-described problem, a second aspect according to the present invention is a cutting work machine including a main unit, and a cutter unit that is driven by driving power of the main unit. The cutter unit includes a cutter support that extends forward from the main unit, upper and lower blades that are connected to the cutter support in a freely movable manner in a front-back direction, and a guard member that is provided at a front end portion of the cutter support. Both of the blades includes cutting edges projecting in a right-left direction. Both blades, stacked on top of each other above and below, are configured to reciprocate in opposite front-back directions. The guard member includes a guard plate that projects in one of right and left directions from the cutter support, and a fixed blade that projects in the other of the right and left directions from the cutter support. Front edge portions of the guard plate and the fixed blade are positioned forward of foremost cutting edges of both blades. The guard plate is positioned below the cutting edge of the lower blade. The fixed blade faces forward against the foremost cutting edge of the lower blade.

In the cutting work machine of the present invention, the guard plate of the guard member and the front edge portion of the fixed blade protect the front end portion of the blade, and the guard plate prevents branches from being chewed between the upper and lower cutting edges.

Furthermore, since the cutting work machine of the present invention can cut branches by trapping them between the fixed blade facing the foremost cutting edge of one blade and the cutting edge of the other blade, it is possible to easily cut branches in the vicinity of the structure and secure a large area to be cut by the blades. Therefore, the cutting work machine of the present invention can increase the work efficiency of trimming and pruning of hedges and plants.

BRIEF DESCRIPTION OF THE DRAWINGS

FIG. 8 is a bottom view illustrating a state in which the lower blade is advanced in the cutting work machine according to the first embodiment of the present invention.

FIG. 9 is a front view illustrating a cutter unit of the cutting work machine according to a second embodiment of the present invention.

DETAILED DESCRIPTION OF THE EMBODIMENTS

Figure 1:
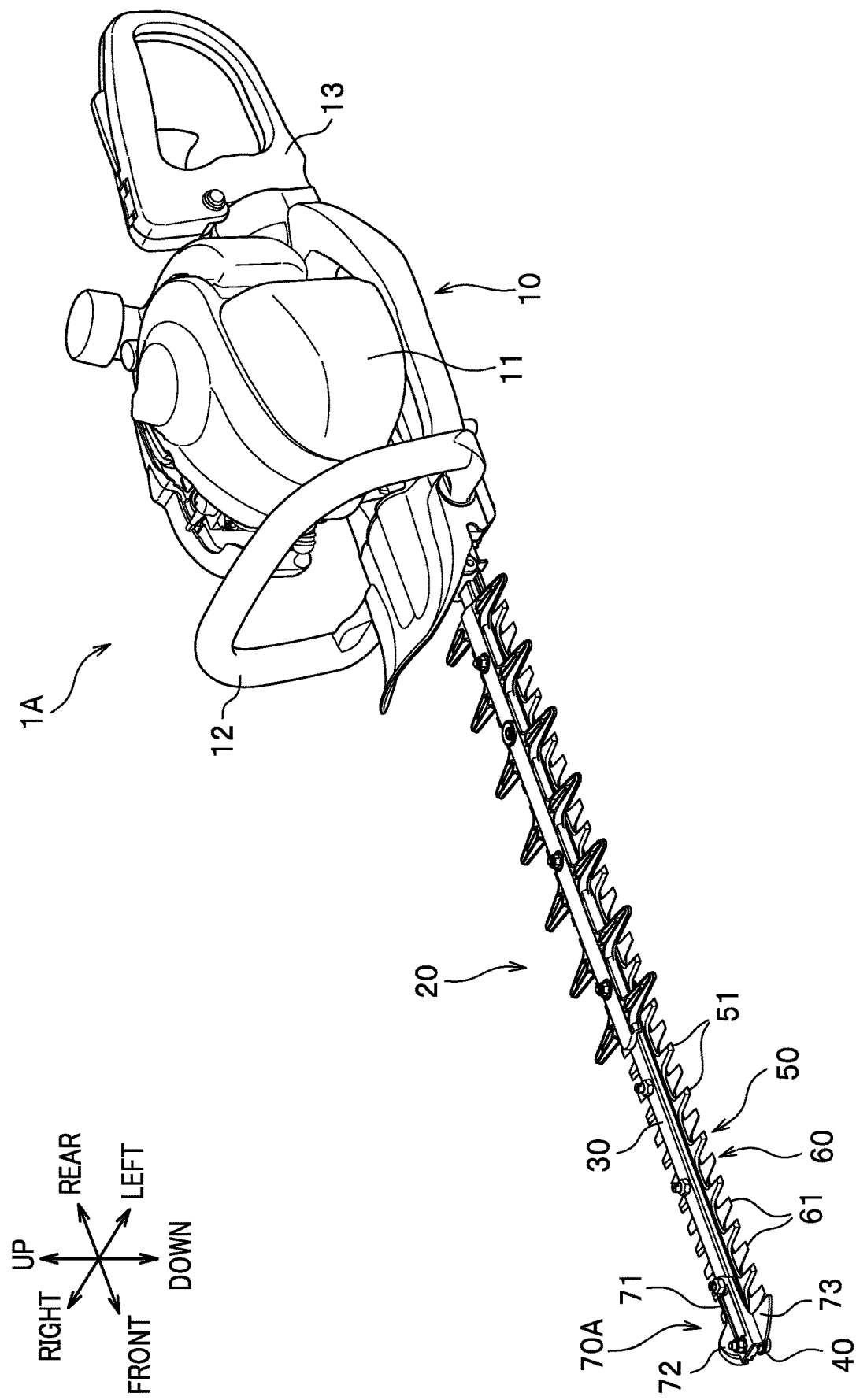
FIG. 1 is a perspective view of a cutting work machine according to a first embodiment of the present invention as viewed from the front upper left.

Embodiments of the present invention will be described in detail with reference to the drawings as appropriate. Note that in the description of each embodiment, the same reference numeral is attached to the same components, and redundant explanations are omitted.

In the following description, the up-down, front-back, and right-left directions are set for convenience in explaining the cutting work machine of the present invention, and are not intended to limit the configuration or use of the cutting work machine.

First Embodiment

The cutting work machine 1A of the first embodiment is a hand-held hedge trimmer used for trimming and pruning hedges and plants, as illustrated in FIG. 1.

The cutting work machine 1A includes a main unit 10 and a cutter unit 20 that is driven by the driving power of the main unit 10.

The main unit 10 includes a main body case 11 made of resin, and a drive source such as an internal combustion engine or an electric motor (not shown) is housed inside the main body case 11.

Provided in front of the main body case 11 is a front handle 12, and provided at rear of the main body case 11 is a rear handle 13. When the operator uses the cutting work machine 1A, they grasp the front handle 12 and the rear handle 13, and operates the control unit such as the power switch or trigger lever provided on the rear handle 13.

The cutter unit 20 includes an upper cutter support 30 that extends in a straight line forward from the main body case 11, and a lower cutter support 40 (see FIG. 3) that is connected to the upper cutter support 30. The cutter unit 20 also includes upper and lower blades 50, 60, which are connected to the upper cutter support 30 and the lower cutter support 40 in a freely movable manner in the front-back direction, and a guard member 70A that is provided at the front end portion of the upper cutter support 30.

The upper cutter support 30 is a straight metallic member extending in the front-back direction, and the rear end portion thereof is connected to and fixed to the gear case (not shown) housed in the main body case 11.

Figure 3:
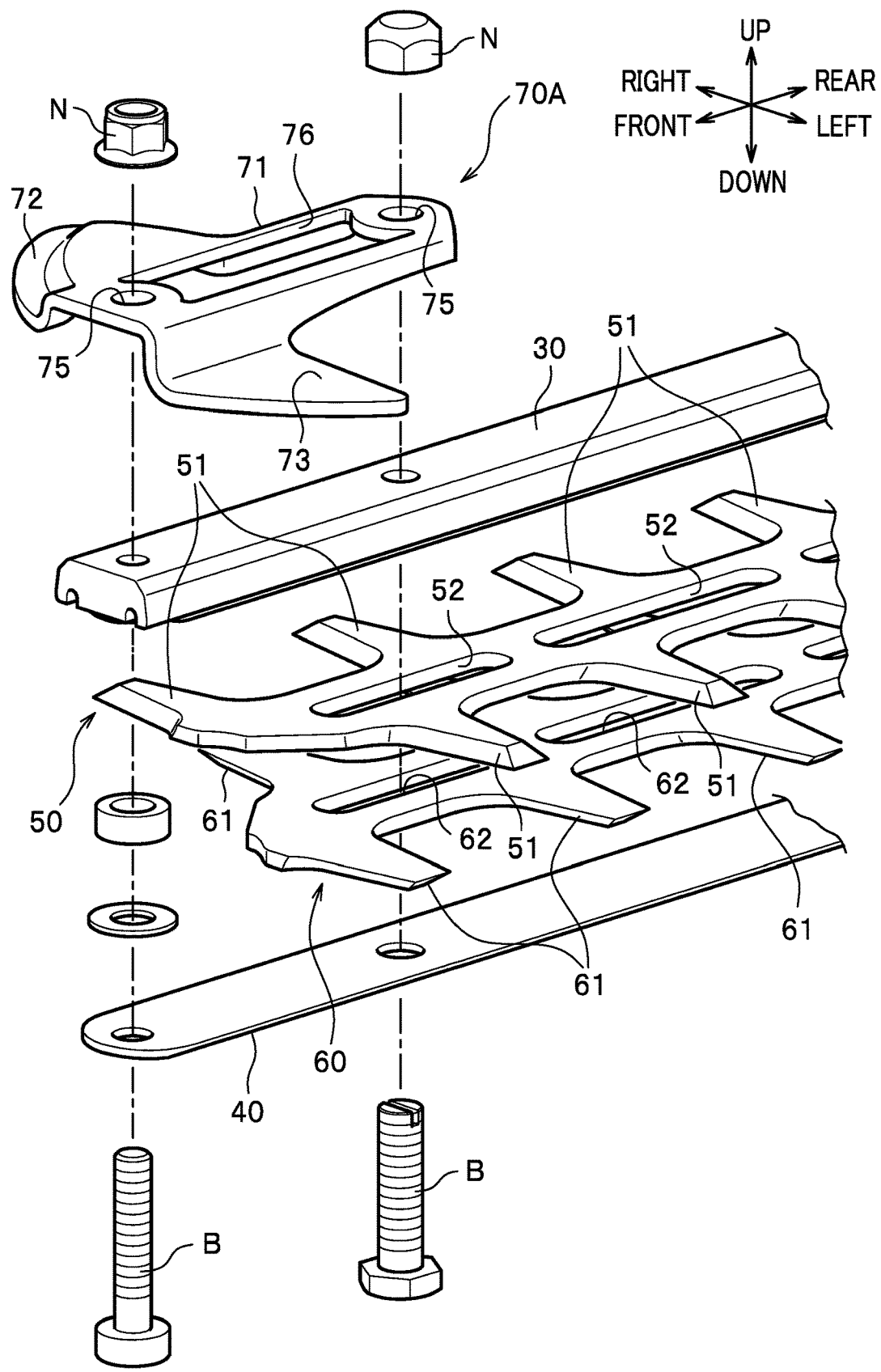
FIG. 3 is an exploded perspective view illustrating the cutter unit of the cutting work machine according to the first embodiment of the present invention.

The lower cutter support 40 is a straight metallic member extending in the front-back direction, as illustrated in FIG. 3, and is positioned directly below the upper cutter support 30. A bolt B inserted from below into the mounting hole of the lower cutter support 40 is inserted into the mounting hole of the upper cutter support 30, and a nut N is screwed onto the tip portion of the bolt B. In this way, the lower cutter support 40 is connected to the lower surface of the upper cutter support 30 with a space between them in the up-down direction.

The upper and lower blades 50, 60 are metallic cutting tools that extend in a straight line in the front-back direction.

Figure 5:
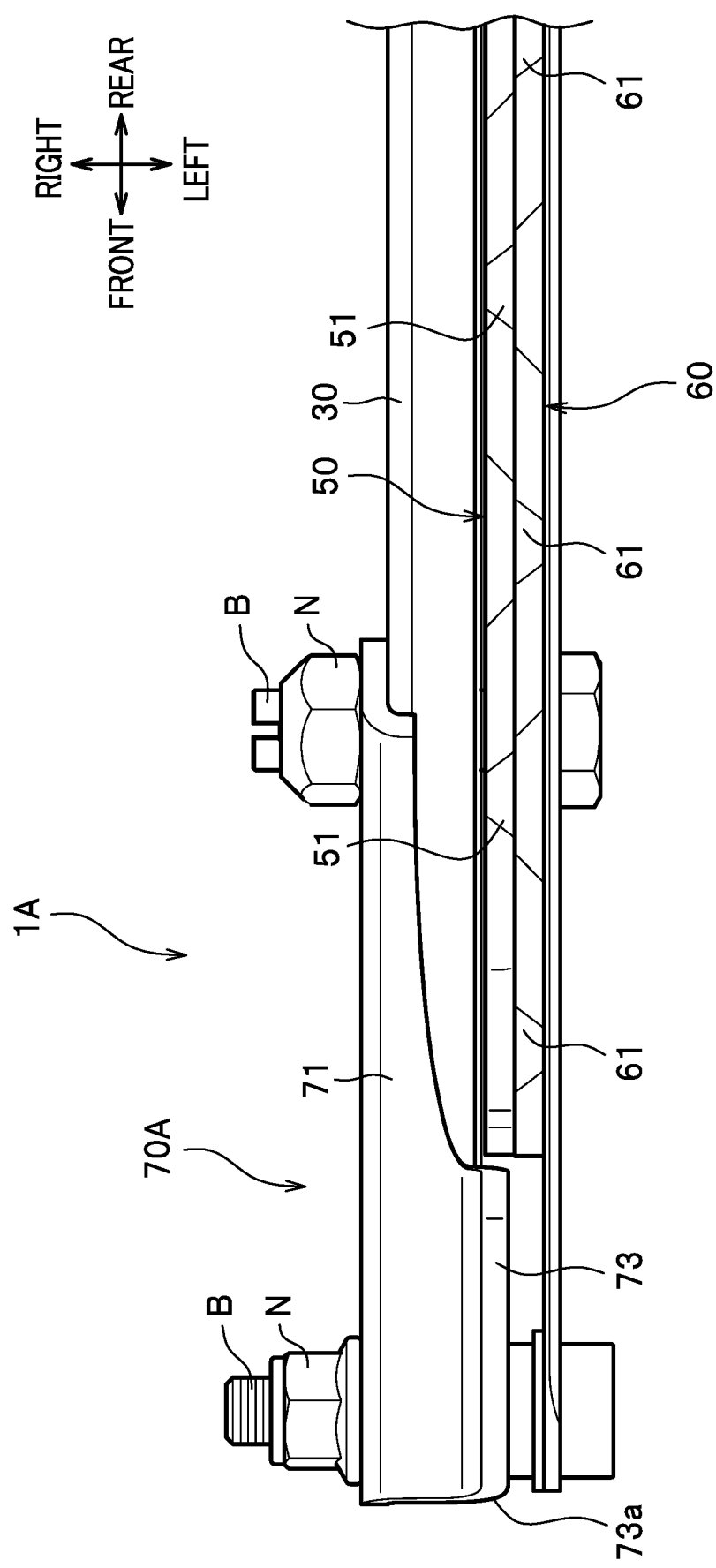
FIG. 5 is a side view illustrating the cutter unit of the cutting work machine according to the first embodiment of the present invention.

The upper and lower blades 50, 60 are stacked on top of each other above and below, and are positioned between the upper cutter support 30 and the lower cutter support 40, as shown in FIG. 5. In other words, the upper cutter support 30 is located above both blades 50 and 60, and the lower cutter support 40 is located below both blades 50 and 60.

On the right and left sides of the upper blade 50 are formed a plurality of cutting edges 51 projecting on both the right and left sides, as shown in FIG. 3. The cutting edges 51 on the right and left are arranged alternately from each other in the front-back direction. In addition, a plurality of cutting edges 61 projecting on both the right and left sides of the lower blade 60 are formed on the right and left sides of the lower blade 60 in the same manner as the upper blade 50.

The upper and lower blades 50, 60 have a plurality of long holes 52, 62 extending in the front-back direction. Bolts B inserted into the mounting holes of the upper cutter support 30 and the lower cutter support 40 are inserted into the long holes 52, 62, which are connected in the upper and lower directions.

The rear end portions of the upper and lower blades 50, 60 are inserted into the main body case 11 and connected to the gear case (not shown) in the main body case 11, as illustrated in FIG. 1. The upper and lower blades 50, 60 are configured to reciprocate in opposite front-back directions by the driving power of the main unit 10, and cut branches by trapping them between the cutting edge 51 of the upper blade 50 and the cutting edge 61 of the lower blade 60.

Figure 2:
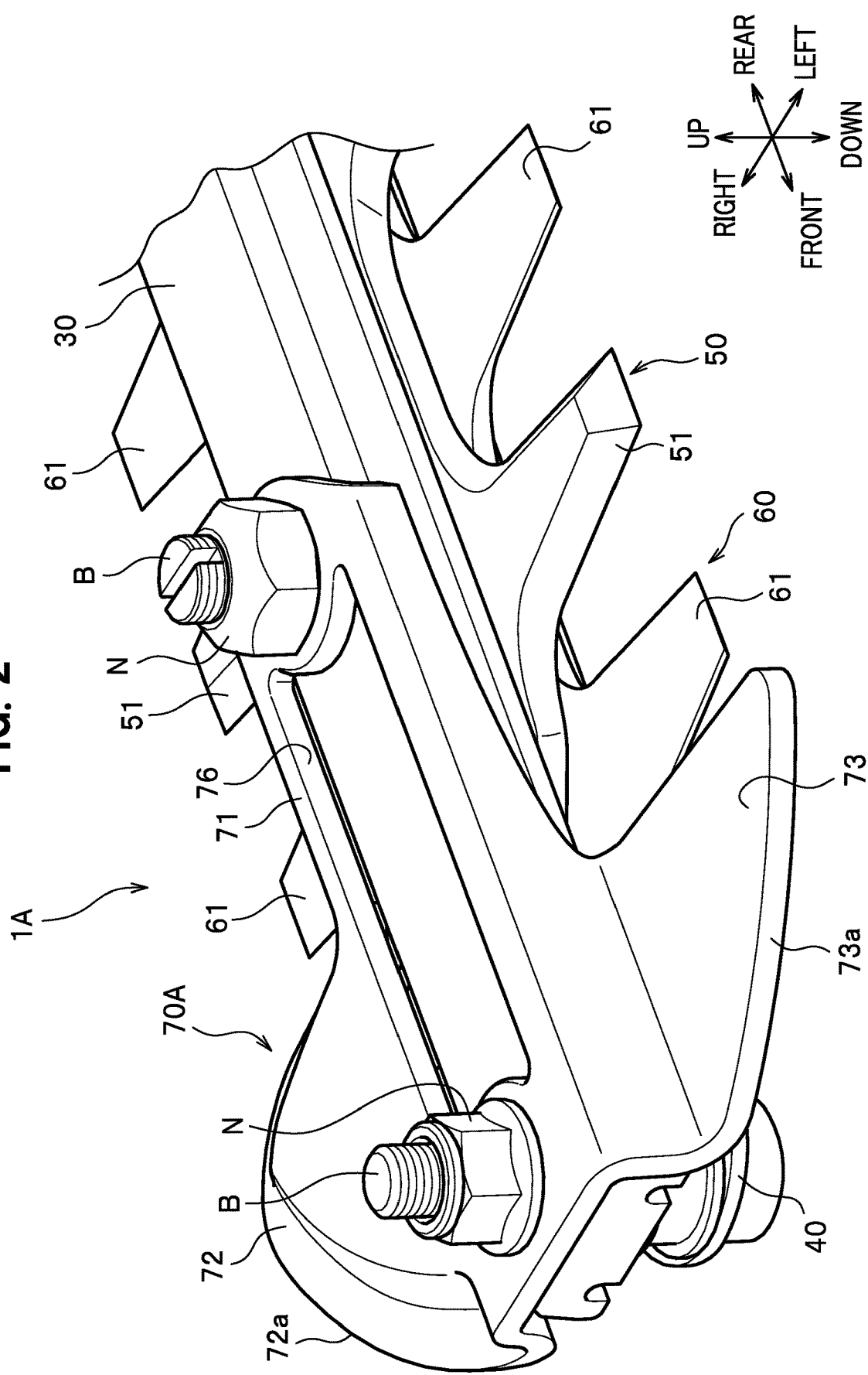
FIG. 2 is a perspective view of a cutter unit of the cutting work machine according to the first embodiment of the present invention as viewed from the front upper left.

The guard member 70A is provided at the front end portion of the upper cutter support 30, as shown in FIG. 2. The guard member 70A is a metallic member to prevent the front end portions of the upper and lower blades 50, 60 from hitting a structure such as a wall or a building during trimming work by the cutting work machine 1A.

The guard member 70A is fixed to the upper cutter support 30 above both blades 50, 60. The guard member 70A has a mounting portion 71 attached to the front end portion of the upper cutter support 30, a guard plate 72 projecting to the right from the mounting portion 71, and a fixed blade 73 projecting to the left from the mounting portion 71.

The mounting portion 71 is a part that is overlaid on the upper surface of the front end portion of the upper cutter support 30. As illustrated in FIG. 3, the mounting portion 71 is fixed to the upper surface of the upper cutter support 30 by inserting the bolts B, inserted into the mounting holes of the upper cutter support 30 and the lower cutter support 40, into the front and rear mounting holes 75, 75 formed in the mounting portion 71, and screwing nuts N onto the bolts B on the upper surface side of the mounting portion 71 (see FIG. 2). The front edge portion of the mounting portion 71 is positioned forward of the front end portions of both blades 50 and 60.

In the mounting portion 71 of the first embodiment, the guard member 70A is made lighter in weight by forming an opening 76 between the front and rear mounting holes 75, 75.

Figure 4:
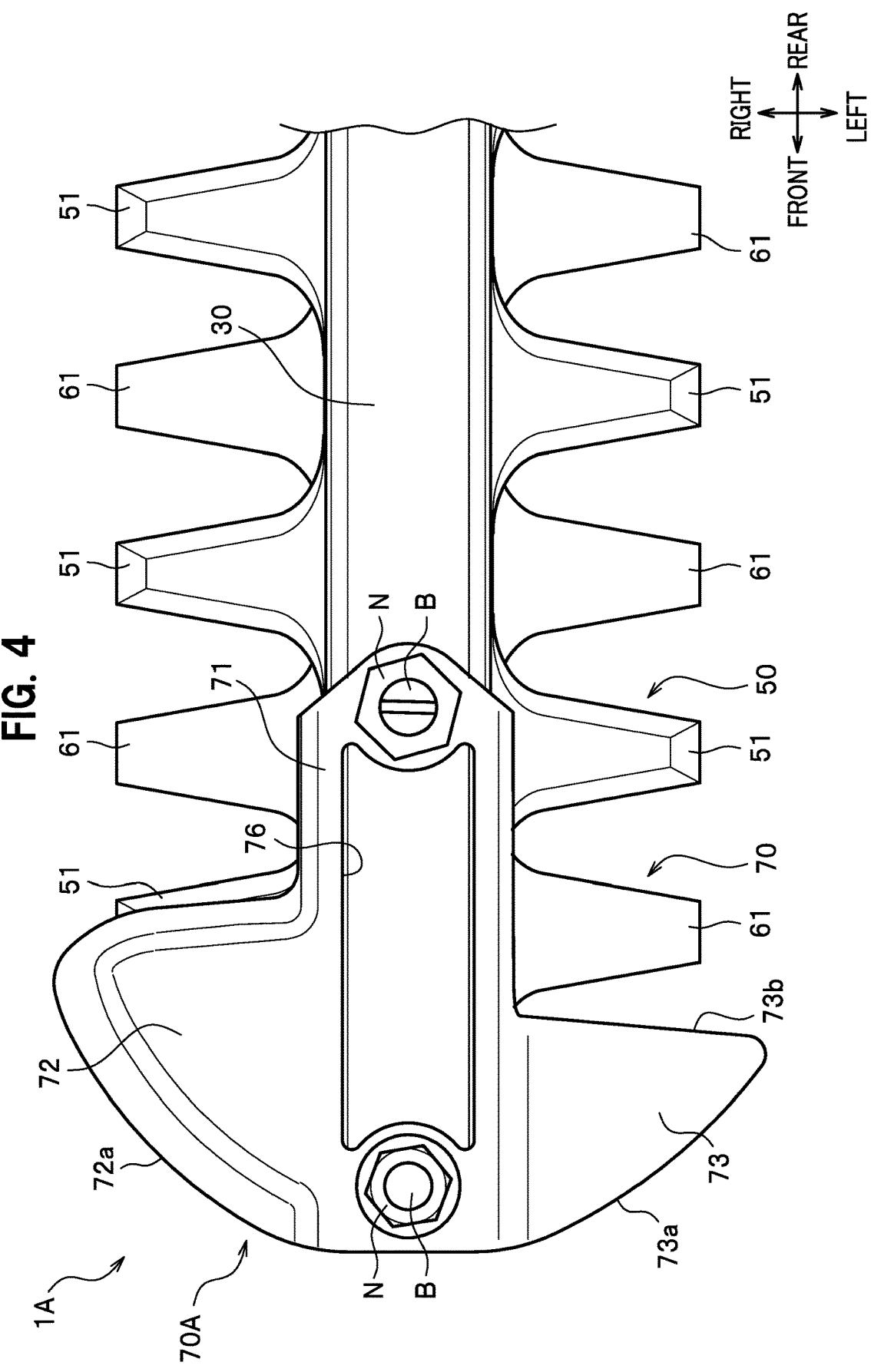
FIG. 4 is a plan view illustrating the cutter unit of the cutting work machine according to the first embodiment of the present invention.

The guard plate 72 is a plate-shaped part projecting to the right from the front portion of the mounting portion 71, as illustrated in FIG. 4. The right end portion of the guard plate 72 is located to the right of the right end portions of the right-side cutting edges 51, 61.

The guard plate 72 is formed in a substantially triangular shape in a plan view. The front edge portion 72a of the guard plate 72 is inclined so as to be displaced backward as going to the right (outward in the right-left direction). In addition, the front edge portion 72a of the guard plate 72 is curved in an arc shape so as to be convex outwardly.

Figure 6:
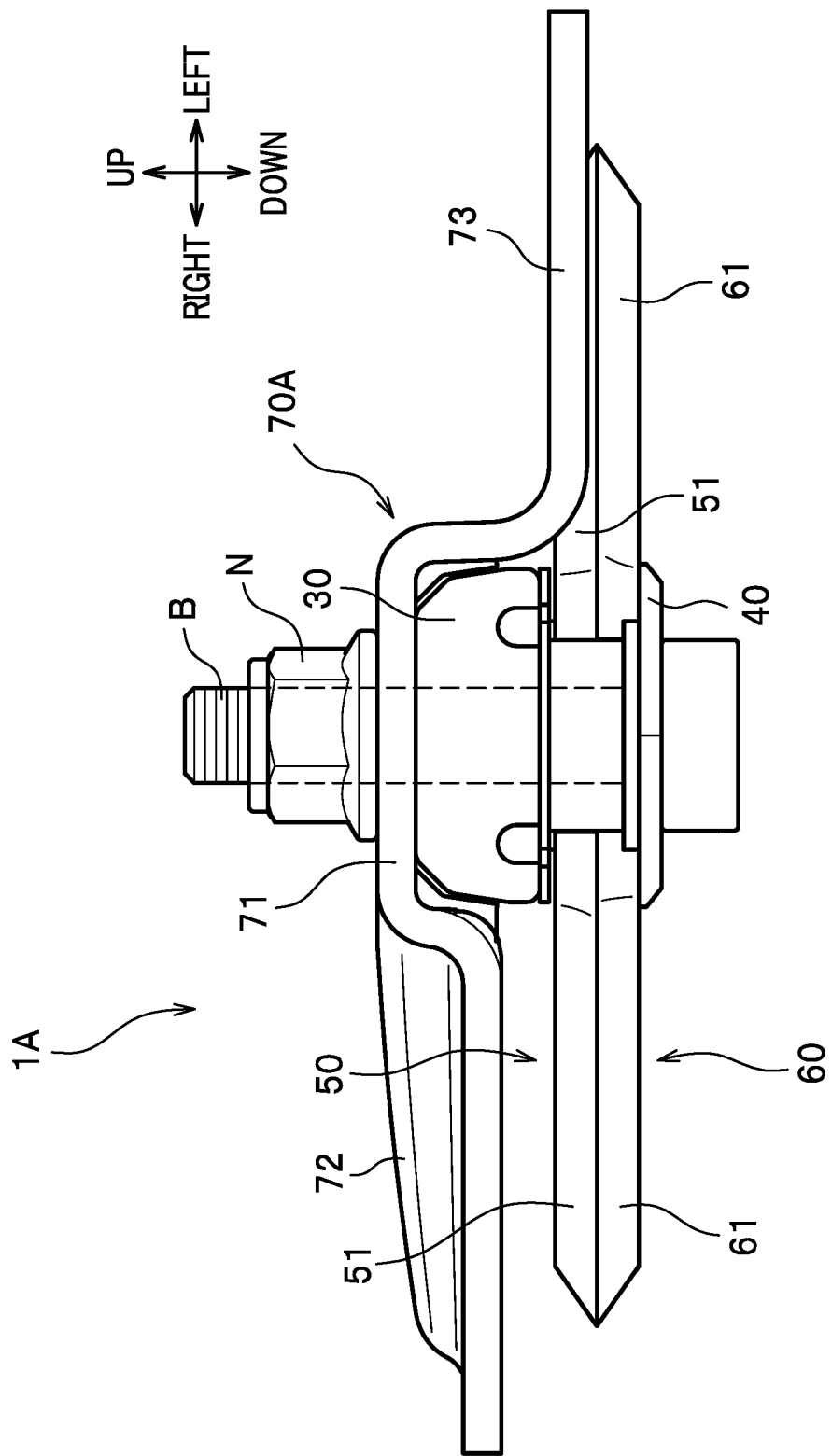
FIG. 6 is a front view illustrating the cutter unit of the cutting work machine according to the first embodiment of the present invention.

The front edge portion 72a and the rear edge of the guard plate 72 are formed at a lower height than the position of the mounting portion 71 (upper surface of the upper cutter support 30), as illustrated in FIG. 6. In other words, the guard plate 72 is depressed at the inner part than the front edge portion 72a and the rear edge portion when viewed from below.

The guard plate 72 is positioned above the cutting edge 51 of the upper blade 50, as illustrated in FIG. 6. The guard plate 72 is placed at a predetermined space to the upper surface of the cutting edge 51 so as not to touch the cutting edge 51 of the upper blade 50. In the present embodiment, the distance between the uppermost surface of the cutting edge 51 of the upper blade 50 and the lowermost surface of the guard plate 72 is set at about 3 mm to prevent branches and leaves from being trapped between the cutting edge 51 and the guard plate 72.

Figure 7:
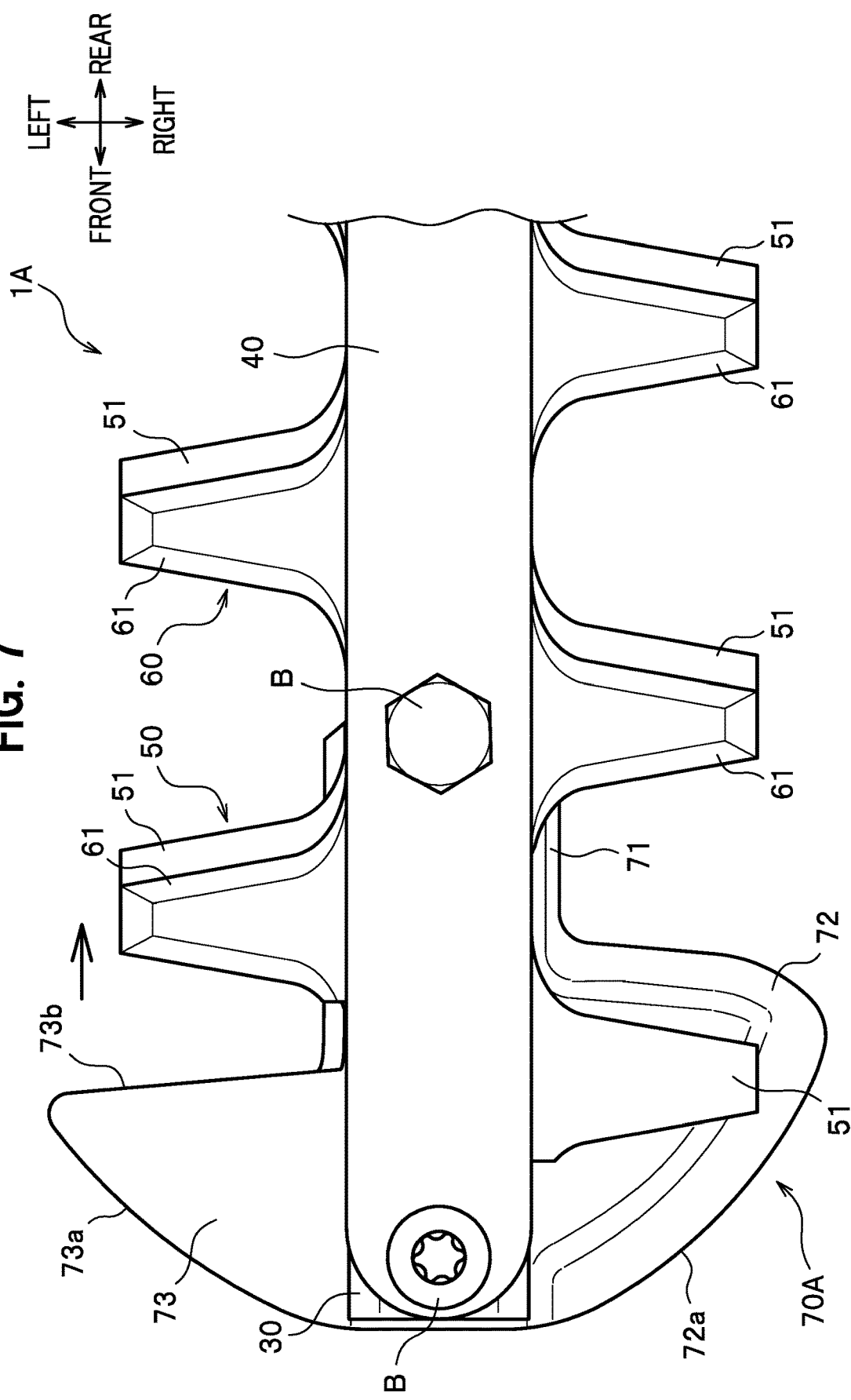
FIG. 7 is a bottom view illustrating a state in which the lower blade is retracted in the cutting work machine according to the first embodiment of the present invention.

The guard plate 72 is configured to cover the right foremost cutting edges 51, 61 of the upper and lower blades 50, 60 as illustrated in FIGS. 7 and 8. The front edge portion 72a of the guard plate 72 is positioned forward of the foremost cutting edges 51, 61 of both blades 50, 60.

The fixed blade 73 is a plate-shaped part projecting to the left from the front portion of the mounting portion 71, as illustrated in FIG. 4. The left end portion of the fixed blade 73 is positioned to the left of the left end portion of the left-side cutting edge 61.

The fixed blade 73 is formed in a substantially triangular shape in a plan view. The rear edge portion 73b of the fixed blade 73 extends in a straight line in the right-left direction orthogonal to the axial direction of the upper cutter support 30.

The front edge portion 73a of the fixed blade 73 is inclined so as to be displaced backward as going to the left (outward in the right-left direction). The front edge portion 73a of the fixed blade 73 is curved in an arc shape so as to be convex outwardly.

In the trimming work of the cutting work machine 1A, which is a hedge trimmer, the operator holds the main unit 10 and swings the upper and lower blades 50, 60 in the right-left direction. In other words, the tip portions of the upper and lower blades 50, 60 move in an arc in the right-left direction. At this time, to prevent the guard plate 72 and the fixed blade 73 from scratching the structure or the like, the front edge portion 72a of the guard plate 72 and the front edge portion 73a of the fixed blade 73 are curved in an arc shape convex outwardly.

The fixed blade 73 faces forward against the foremost cutting edge 51 of the upper blade 50, as illustrated in FIG. 5. The front edge portion 73a of the fixed blade 73 is positioned forward of the left foremost cutting edges 51 and 61 of both lower blades 50 and 60. The rear edge portion of the guard plate 72 is positioned rearward of the rear edge portion 73b of the fixed blade 73.

The position in the up-down direction of the lower surface of the fixed blade 73 and the position in the up-down direction of the lower surface of the cutting edge 51 of the upper blade 50 are located at approximately the same position. Note that the position in the up-down direction of the lower surface of the fixed blade 73 is preferably set at or below the position in the up-down direction of the upper surface of the cutting edge 51 of the upper blade 50.

As illustrated in FIG. 7, when the lower blade 60 is most retracted and the upper blade 50 is advanced, the fixed blade 73 and the left foremost cutting edge 61 of the lower blade 60 are separated in the front-back direction. Thus, the fixed blade 73 is configured not to overlap the cutting edge 61 of the lower blade 60 when the lower blade 60 is most retracted. Also, the fixed blade 73 and the left foremost cutting edge 51 of the upper blade 50 are separated in the front-back direction.

As illustrated in FIG. 8, when the lower blade 60 is most advanced, the upper surface of the left foremost cutting edge 61 of the lower blade 60 is configured to overlap the lower surface of the fixed blade 73. Thus, the fixed blade 73 is configured to overlap at least a portion of the cutting edge 61 of the lower blade 60 when the lower blade 60 is most advanced. This makes it possible to trap branches at their front and back and cut them by the fixed blade 73 and the lower cutting edge 61.

Note that it is preferable to configure so that the fixed blade 73 and the cutting edge 61 of the lower blade 60 do not completely overlap each other when the lower blade is most retracted. It is preferable to set a clearance of about 10 to 20 mm in the front-back direction between the fixed blade 73 and the cutting edge 61, and in the present embodiment, the clearance is configured to be about 15 mm. This allows extending the area that can be trimmed by the fixed blade 73 and the lower cutting edge 61 at the tip portion of the cutting work machine 1A.

As illustrated in FIG. 1, the cutting work machine 1A of the first embodiment includes a main unit 10 and a cutter unit 20 that is driven by the driving power of the main unit 10.

As illustrated in FIG. 2, the cutter unit 20 includes an upper cutter support 30 that extends forward from the main unit 10, upper and lower blades 50, 60, which are connected to the upper cutter support 30 in a freely movable manner in the front-back direction, and a guard member 70A that is provided at the front end portion of the upper cutter support 30.

Both blades 50 and 60 include cutting edges 51 and 61 projecting in the right-left direction. Both blades 50 and 60, stacked on top of each other above and below, are configured to reciprocate in opposite front-back directions.

The guard member 70A includes a guard plate 72 that projects to the right from the upper cutter support 30 and a fixed blade 73 that projects to the left from the upper cutter support 30. The front edge portions 72a, 73a of the guard plate 72 and the fixed blade 73 are positioned forward of the foremost cutting edges 51, 61 of both blades 50, 60. The guard plate 72 is positioned above the cutting edge 51 of the upper blade 50. The fixed blade 73 faces forward against the foremost cutting edge 51 of the upper blade 50.

As illustrated in FIG. 7, the cutting work machine 1A of the first embodiment is configured so that the fixed blade 73 does not overlap the cutting edge 61 of the lower blade 60 when the lower blade 60 is most retracted. In addition, the fixed blade 73 is configured to overlap at least a portion of the cutting edge 61 of the lower blade 60 when the lower blade 60 is most advanced, as illustrated in FIG. 8.

In the cutting work machine 1A as described above, as illustrated in FIG. 2, the guard plate 72 and the fixed blade 73 of the guard member 70A can prevent the front end portions of both blades 50, 60 from hitting a structure, thereby protecting both blades 50, 60.

In the cutting work machine 1A of the first embodiment, the guard plate 72 of the guard member 70A covers the cutting edges 51, 61 at the front portions of both blades 50, 60, making it possible to prevent branches from being chewed between the upper and lower cutting edges 51, 61.

In the cutting work machine 1A of the first embodiment, as illustrated in FIG. 8, branches in the vicinity of a structure can be easily cut because branches can be trapped and cut by the fixed blade 73 of the guard member 70A provided at the front end portion of the upper cutter support 30 and the foremost cutting edge 61 of the lower blade 60. Therefore, the cutting work machine 1A of the first embodiment can increase the work efficiency of trimming and pruning hedges and plants.

In the cutting work machine 1A of the first embodiment, as illustrated in FIG. 4, the front edge portions 72a, 73a of the guard plate 72 and the fixed blade 73 are inclined so as to be displaced backward as going outward in the right-left direction. With this configuration, branches in front of the guard member 70A can be easily guided along the front edge portions 72a, 73a of the guard plate 72 and the fixed blade 73 to the rear of the guard member 70A, so that the branches in the vicinity of the structure can be easily cut.

In the cutting work machine 1A of the first embodiment, as illustrated in FIG. 5, the position in the up-down direction of the lower surface of the fixed blade 73 is at or below the position in the up-down direction of the upper surface of the cutting edge 51 of the upper blade 50. With this configuration, trimming work can be performed by the lower surface of the fixed blade 73 and the upper surface of the foremost cutting edge 61 of the lower blade 60 in the same manner as with a normal cutting edge.

In the cutting work machine 1A of the first embodiment, the rear edge portion of the guard plate 72 is positioned rearward of the rear edge portion of the fixed blade 73, as illustrated in FIG. 4. With this configuration, it is difficult for chewing to occur behind the guard plate 72.

Although the first embodiment of the present invention has been described above, the present invention is not limited to the first embodiment and can be appropriately modified without departing from the spirit of the first embodiment.

In the guard member 70A of the first embodiment, as illustrated in FIG. 2, the guard plate 72 projects to the right from the upper cutter support 30 and the fixed blade 73 projects to the left from the upper cutter support 30. However, the guard plate 72 may be allowed to project to the left from the upper cutter support 30 and the fixed blade 73 may be allowed to project to the right from the upper cutter support 30.

In the guard member 70A of the first embodiment, as illustrated in FIG. 4, the guard plate 72 and the fixed blade 73 are formed in a substantially triangular shape in a plan view, but the shapes of the guard plate 72 and the fixed blade 73 are not limited and may, for example, be extended in a straight line in the right-left direction.

The rear end surface of the fixed blade 73 of the first embodiment is formed perpendicular to the upper surface and lower surface, but may be inclined from the upper surface and lower surface to enhance the cutting performance of the fixed blade 73.

In the cutting work machine 1A of the first embodiment, as illustrated in FIG. 3, the upper cutter support 30 and the guard member 70A are separately formed, but the guard member 70A may be integrally formed at the front end portion of the upper cutter support 30.

Second Embodiment

Next, the cutting work machine 1B according to the second embodiment will be described.

As shown in FIG. 9, the cutting work machine 1B of the second embodiment has substantially the same configuration as that of the cutting work machine 1A of the first embodiment (see FIG. 6), with the difference being the arrangement of the guard member 70B.

The guard member 70B of the second embodiment is provided at the front end portion of the lower cutter support 40. In other words, the guard member 70B of the second embodiment is connected to the upper cutter support 30 via the lower cutter support 40. The guard plate 72 of the guard member 70B is positioned below the cutting edge 61 of the lower blade 60.

The fixed blade 73 of the second embodiment faces forward against the foremost cutting edge 61 of the lower blade 60. The fixed blade 73 is configured not to overlap the cutting edge 51 of the upper blade 50 when the upper blade 50 is most retracted. Also, the fixed blade 73 is configured to overlap at least a portion of the cutting edge 51 of the upper blade 50 when the upper blade 50 is most advanced. This makes it possible to trap branches at their front and back and cut them by the fixed blade 73 and the foremost cutting edge 51 of the upper blade 50.

The second embodiment of the present invention has been described above, but the present invention is not limited to the second embodiment described above, and as in the case of the first embodiment described above, it can be modified as appropriate without departing from the spirit thereof.

In the cutting work machine 1B of the second embodiment, the guard member 70B is integrally formed on the lower cutter support 40, but the lower cutter support 40 and the guard member 70B may be formed separately.

What is claimed is:

1. A cutting work machine comprising:
   a main unit; and
   a cutter unit that is driven by driving power of the main unit, wherein
   the cutter unit includes
      a cutter support that extends forward from the main unit,
      upper and lower blades that are connected to the cutter support in a freely movable manner in a front-back direction, and
      a guard member that is provided at a front end portion of the cutter support,
   both of the blades includes cutting edges projecting in a right-left direction,
   both blades, stacked on top of each other above and below, are configured to reciprocate in opposite front-back directions,
   the guard member includes
      a guard plate that projects in one of right and left directions from the cutter support, and
      a fixed blade that projects in the other of the right and left directions from the cutter support,
   front edge portions of the guard plate and the fixed blade are positioned forward of foremost cutting edges of both blades,
   the guard plate is positioned above the cutting edge of the upper blade, and
   the fixed blade faces forward against the foremost cutting edge of the upper blade.

2. The cutting work machine according to claim 1, wherein
   a position in an up-down direction of a lower surface of the fixed blade is at or below a position in the up-down direction of an upper surface of the cutting edge of the upper blade.

3. The cutting work machine according to claim 1, wherein the fixed blade is configured not to overlap the cutting edge of the lower blade when the lower blade is most retracted, and the fixed blade is configured to overlap at least a portion of the cutting edge of the lower blade when the lower blade is most advanced.

4. A cutting work machine comprising:

a main unit; and a cutter unit that is driven by driving power of the main unit, wherein the cutter unit includes a cutter support that extends forward from the main unit, upper and lower blades that are connected to the cutter support in a freely movable manner in a front-back direction, and a guard member that is provided at a front end portion of the cutter support, both of the blades includes cutting edges projecting in a right-left direction, both blades, stacked on top of each other above and below, are configured to reciprocate in opposite front-back directions, the guard member includes a guard plate that projects in one of right and left directions from the cutter support, and a fixed blade that projects in the other of the right and left directions from the cutter support, front edge portions of the guard plate and the fixed blade are positioned forward of foremost cutting edges of both blades, the guard plate is positioned below the cutting edge of the lower blade, and the fixed blade faces forward against the foremost cutting edge of the lower blade.

5. The cutting work machine according to claim 4, wherein the fixed blade is configured not to overlap the cutting edge of the upper blade when the upper blade is most retracted, and the fixed blade is configured to overlap at least a portion of the cutting edge of the upper blade when the upper blade is most advanced.

6. The cutting work machine according to claim 1, wherein the front edge portions of the guard plate and the fixed blade are inclined so as to be displaced backward as going outward in the right-left direction.

7. The cutting work machine according to claim 4, wherein the front edge portions of the guard plate and the fixed blade are inclined so as to be displaced backward as going outward in the right-left direction.

8. The cutting work machine according to claim 1, wherein a rear edge portion of the guard plate is positioned rearward of a rear edge portion of the fixed blade.

9. The cutting work machine according to claim 4, wherein a rear edge portion of the guard plate is positioned rearward of a rear edge portion of the fixed blade.

* * * * *